United States Patent [19]

Hochberg

[11] 4,231,189
[45] Nov. 4, 1980

[54] PLANT GROWING ASSEMBLY

[76] Inventor: Mordecai Hochberg, Old Kfar-Aharon near Ness-Ziona, Israel

[21] Appl. No.: 947,514

[22] Filed: Oct. 2, 1978

[30] Foreign Application Priority Data
Oct. 27, 1977 [IL] Israel .............................. AD.50469
Nov. 28, 1977 [IL] Israel .............................. AD.50469

[51] Int. Cl.³ .............................................. A01G 9/02
[52] U.S. Cl. ............................................ 47/83; 47/39; 47/73; 220/4 E
[58] Field of Search .................. 47/82, 83, 66, 39, 73, 47/80; 220/4 E, 466

[56] References Cited

U.S. PATENT DOCUMENTS

| 185,468 | 12/1876 | Archer | 47/83 X |
| 1,752,597 | 4/1930 | Jackson | 47/83 |
| 2,588,957 | 3/1952 | Brown | 220/4 E |
| 4,034,926 | 7/1977 | Wegner | 220/4 E |

FOREIGN PATENT DOCUMENTS

| 23956 | of 1925 | Australia | 47/83 |
| 682736 | 6/1930 | France | 47/66 |
| 23962 | of 1899 | United Kingdom | 47/83 |
| 566529 | 1/1945 | United Kingdom | 47/73 |

Primary Examiner—Steven A. Bratlie
Attorney, Agent, or Firm—Arthur G. Yeager

[57] ABSTRACT

Two upright perforate pipes, one inside the other, the space between the pipes being filled with soil and the inner pipe being filled with solid nutrient material. The inner pipe is provided with a closeable opening to permit removal of exhausted nutrient materials.

2 Claims, 5 Drawing Figures

FIG.1
FIG.2
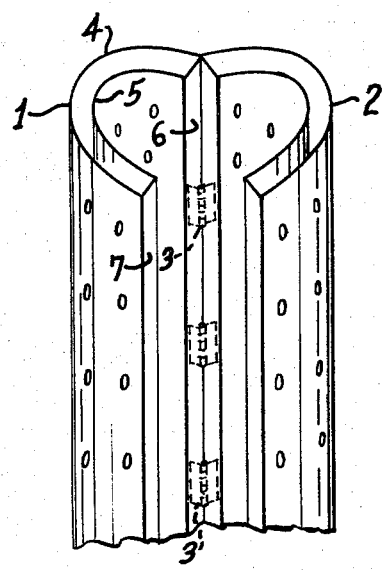
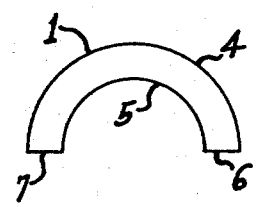
FIG.3
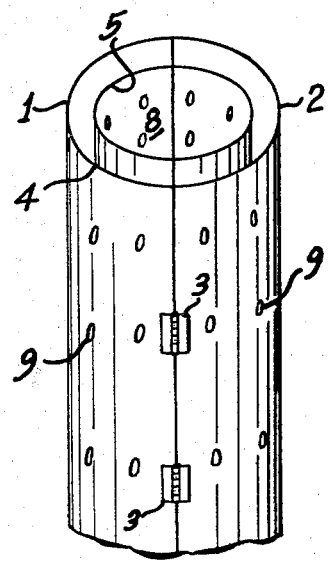
FIG.4
FIG.5
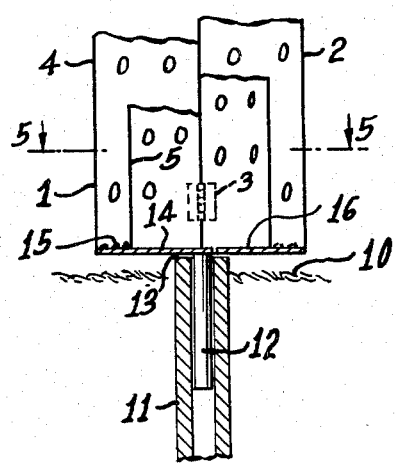
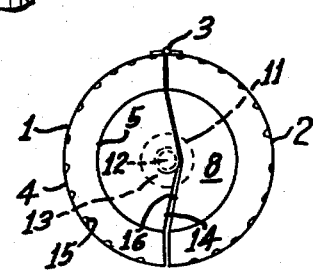

PLANT GROWING ASSEMBLY

SUMMARY OF THE INVENTION

This invention relates to a system for growing plants in upright standing pipes. Generally, we use six or eight inch pipes, but other diameters are also possible. The pipes stand perpendicular to the ground and are filled with soil, volcanic tuff, peat, composts, or mixtures of them. Rows of holes are made in the pipes at definite intervals and in those holes we sow or plant the crop into the substrate, which is inside the pipe. This sytem utilizes the sun's rays better than the common system of growing crops on the earth, and is also useful for gardening in regions where the soil is poor or even rocky.

BACKGROUND OF THE INVENTION

In the common system of growing plants in pipes, the pipes are irrigated from above by dripping water or water with a food solution as in hydroponics.

The disadvantage in this system is that it is impossible to renew the substrate within the pipe, unless we empty the pipe completely, a process which demands much labor. Because it is impossible to renew the fertilizers in the pipe, and as the fertility of the soil decreases with time and with changing of crops, the crops are irrigated with chemical solutions of fertilizers within the irrigating water. This system may cause salinity and is also unsuitable for gardeners who are against the use of chemical fertilizers. My installation enables the growth of plants with the aid of organic fertilizers, and enables the renewing and the enrichment of substrate for the crop at any time it is needed.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a perspective view of a portion of plant growing assembly embodying my invention, the assembly being shown in open position;

FIG. 2 is a top plan view of one element of the assembly;

FIG. 3 is a view similar to FIG. 1 showing the assembly in closed operative position;

FIG. 4 is a side elevational view of a modified embodiment of my invention shown partially broken away; and FIG. 5 is a sectional view taken along line 5—5 of FIG. 4.

DETAILED DESCRIPTION OF THE INVENTION

My installation is built of two pipes, one of them being much smaller in diameter than the other, and of which, the smaller diameter pipe is inserted into the larger diameter pipe, and between the two pipes is a free space. The smaller inner diameter pipe (about two or three inches in diameter, but other dimensions are also possible) is perforated with holes on all sides on its entire length or alternatively is made of screening material. The lower end portion of the inner pipe extends laterally outwardly through the wall of the outer pipe, and terminates in a removable drain plug.

Fertilizer is put inside the inner pipe, and is preferrably all or in part organic, such as manure or compost. It is possible to add wood ash and other desirable additives. This pipe with the fertilizers is inside the second outer tube; and in the free space, which is between these two pipes, substrate is placed as in the usual system. The mixture in the outer pipe encircles the inner pipe. In the wall of the outer pipe openings are made, in which crops are sowed or seedlings are planted into the substrate.

When the plant roots develop, they will enter into the inner pipe and will take advantage of the nutrients that are in the fertilizer mixture. When the mixture in the inner pipe becomes less concentrated, we empty the inner pipe by water pressure from the top of the pipe or from the bottom. After the cleaning, the drain plug is closed and the pipe is refilled with a new mixture of fertilizer.

Alternately, it is possible to empty the inner pipe with the aid of a ground drill from above, or by any other method, which empties the used mixture and enables us to put in new mixture. The pipes may be made of metal, plastic, screening, wood asbestos or any other suitable material.

Accordingly to one embodiment of the invention, the lower end of the inner pipe is closed and the inner pipe may be pulled longitudinally from the outer pipe for cleaning out exhausted fertilizer or other nutrient material and for refilling with effective nutrient material.

Alternatively, a flushing tube may be connected to the inner pipe and extend outwardly of the pipe by means of which the exhausted nutrient may be flushed by water from the inner pipe to permit replacement thereof.

In order to make the renewing of the fertilizer easier, it is possible to build the installation in the way: 1. The installation is built in two parts 1 and 2 that are attached together by hinges 3. 2. Each half of the installation is built of two halves of pipes—one 4 of a large diameter and the other 5 of a smaller diameter. 3. The large diameter pipe 4 is the outer surface and the small diameter pipe 5 is the inner surface. The pipes 4 and 5 are attached together on the whole length by strips 6 and 7 of metal or plastic or some other material. (See FIG. 1., where pipe 4 constitutes the outer wall and pipe 5 constitutes the inner wall with the smaller diameter and 6 and 7 are the strips that connect the semicylindrical pipes 4 and 5 together.) This structure, which is half of the entire installation, is the receptacle into which the substrate is placed. Two structures, 1 and 2 as shown in FIG. 2 are connected in a suitable manner so that we have two sides with substrate, and, as seen in FIGS. 1 and 3, they are joined together with hinges 3. With its closing the installation is like a pipe, as seen in back view in FIG. 3. In the hollow center 8 of this double pipe, which is made of two halves 1 and 2 (or more in the same fashion), a hollow 8 is formed in which fertilizers are put. At the time that the fertilizers need to be renewed, we open the two halves of the installation as shown in FIG. 1. We empty the fertilizers, close the installation and fill up the center again.

As in the original installation, whereby this installation is an improvement, the outer pipe 4 is provided with 9 holes for sowing seeds and planting seedling, and the inner pipe has holes or is built from a screening material, in order to permit the roots to penetrate the inner fertilizers.

One of the problems of growing plants in perpendicular standing pipes is that there exists one side, in Israel the northern side, which almost never receives sunlight. As a result of this, the plants that grow on this side are of a poor quality. In order to overcome this disadvantage, it is possible to build the growing pipes so that they are able to turn on their axis, and in this way, the gardender is able, from time to time, to place the other side of the installation in the full sun and to achieve more uniformity in growth and a better yield.

It is possible to achieve this, as was done in the past, by placing the growing pipe on a platform with wheels, which allows it to move or turn.

A suggested possibility in this specification, as shown in FIGS. 4 and 5, is to insert deeply into the soil or surface 10, a pipe 11 of a large diameter, and into this pipe, insert a smaller diameter pipe or rod 12 that fits closely to the larger outer pipe, but which can turn freely within the larger dimetered one. The top lip 13 of the larger diameter pipe is level with the ground or protrudes a little from the ground. The smaller diameter pipe 12 that is inside the larger one serves as a vertical axle support for the installation on which the growing surface is attached. To the smaller diameter pipe, a plate 14 of metal or other hard material is welded or otherwise attached. This plate 14 will be supported by the lip 13 of the larger diameter pipe and is the floor of any type of growing pipe. As seen, the plate 14 is so shaped as to extend over the supporting axle 12 and to the outer growing semicylindrical pipe 4 of one structure 1, and this plate 14 may be welded as at 15 to the lower ends of one or another or all of elements 4, 5, 6 and 7 of the semicylindrical assembly 1. A second smaller plate 16 complementary to plate 14 is attached to the lower end of the similar members of assembly 2. Plate 16 overlies and engages a portion of the upper lip 13 of the ground support pipe 11. The sections 1 and 2 are, accordingly, movable apart, as shown in FIG. 1, each is supported by engagement of the respective plate 14 or 16 with the upper end of pipe 11, and the plates and growing pipes are free to turn on the axis of axle 12 to orient the selected side of the installation toward the sun.

In the specification of the application in the first addition, it is noted that it is possible to build the growing pipes from different material, hard or flexible.

In order to build installation that are made of material such as plastic screening or plastic sheeting or other materials which are not able to stand erect and carry within them the load, it is possible to use a stiff core, which is the backbone of the installation. This stiff core can be a pipe made of iron or other metals or other hard metals, or can be a post or pole of any geometric form and any stiff or hard material, which can carry the load of the installation. To this backbone the screening or sheeting, which the growing pipe itself, is attached or fixed, or welded in all forms which are described in the patent application. This backbone is inserted deeply into the ground or attached to a framework of other backbones. At the base of the backbone, concrete can be poured or the backbones can be inserted into another base. This pole can be attached to the growing pipe from the inside or from the outside. This pole can be also part of the structure of a green house. It can stand upright or at any angle.

If it is preferred to build a growing pipe of two wings, that can be opened, as is described in the first addition of this patent application, the pole can be the axis to which the growing pipe is joined and this growing pipe can move away from both sides of the pole. This type of growing pipe, that can open, can also be built with two wings of screening material or other flexible material, and the two sections are where one is the continuation of the second. When the growing pipe is opened to change the fertilizers, the cross-section as seen from above is in the form of a horseshoe. When the growing pipe is closed around the pole, its cross-section as seen from above, is like a ring.

I claim:

1. A plant growing assembly comprising two upright sections, each section comprising a generally semi-cylindrical perforate outer wall and a generally semi-cylindrical perforate inner wall spaced therefrom, each said wall having opposite, side edges, means joining each side edge of said inner wall to a corresponding said side edge of said outer wall, said sections being arranged in juxtaposed parallel positions with said side edges of one section engaged with corresponding respective side edges of the other said section whereby said inner walls define a central fertilizer chamber and said inner and outer walls define therebetween an annular soil chamber outwardly around said fertilizer chamber, and hinge means connecting a side edge of the outer wall of said one section to the corresponding side edge of the outer wall of said other section whereby said sections are swingable apart to open said fertilizer chamber.

2. The combination according to claim 1 wherein said sections have lower ends, a respective plate joined to the lower end of each section, a support rod joined to and extending downwardly from one said plate, a socket member surrounding said rod and having an upper end engaged with said plates, said rod being rotatable in said socket member.

* * * * *